US008362403B2

(12) United States Patent
Whysall (10) Patent No.: US 8,362,403 B2
(45) Date of Patent: Jan. 29, 2013

(54) OVEN DRIVE LOAD MONITORING SYSTEM (75) Inventor: Simon A. Whysall, Goldsboro, NC (US)

(73) Assignee: Baking Acquisition, LLC, Elgin, IL (US)

( * ) Notice: Subject to any disclaimer, the term of this patent is extended or adjusted under 35 U.S.C. 154(b) by 348 days.

(21) Appl. No.: 12/717,477

(22) Filed: Mar. 4, 2010

(65) Prior Publication Data
US 2010/0181297 A1 Jul. 22, 2010

Related U.S. Application Data (63) Continuation-in-part of application No. PCT/US2008/077789, filed on Sep. 26, 2008.

(60) Provisional application No. 60/978,005, filed on Oct. 5, 2007, provisional application No. 61/157,707, filed on Mar. 5, 2009, provisional application No. 61/160,455, filed on Mar. 16, 2009, provisional application No. 60/975,618, filed on Sep. 27, 2007.

(51) Int. Cl.
F27D 5/00 (2006.01)

(52) U.S. Cl. .......................... 219/392; 219/391; 219/393

(58) Field of Classification Search .................. 219/391, 219/392, 393
See application file for complete search history.

(56) References Cited

U.S. PATENT DOCUMENTS

| 3,673,949 | A | * | 7/1972 | Arganbright et al. | ........ 99/443 C |
| 4,059,398 | A | | 11/1977 | Zimmer et al. | |
| 4,398,761 | A | * | 8/1983 | Hanson et al. | .............. 294/104 |
| 4,982,609 | A | * | 1/1991 | Talley, III | ........................ 73/849 |
| 5,112,630 | A | * | 5/1992 | Scott | ............................. 426/233 |

FOREIGN PATENT DOCUMENTS

| EP | 1 045 207 A2 | 10/2000 |
| GB | 2 067 494 A | 7/1981 |
| JP | 9-221216 | 8/1997 |
| WO | WO 2009/042831 A1 | 4/2009 |

OTHER PUBLICATIONS

Notification of Transmittal of the International Search Report and the Written Opinion of the International Searching Authority, or the Declaration dated Mar. 4, 2009 from parent PCT Application No. PCT/US2008/077789, filed Sep. 26, 2008.
Written Opinion of the International Preliminary Examining Authority dated Apr. 12, 2010 from parent PCT Application No. PCT/US2008/077789, filed Sep. 26, 2008.
Anonymous: "Upgrades & Rebuilds for maximum performance, productivity and safety" Turkingon Aftermarket Brochure, [On-Line] XP002512895, Retrieved from the Internet: URL:http://www.turkingtonusa.com/pdf%20files/Aftermarket_Brochure.pdf> p. 3.

* cited by examiner

Primary Examiner — Julio J Maldonado
Assistant Examiner — Robert Bachner
(74) Attorney, Agent, or Firm — Womble Carlyle Sandridge & Rice LLP (57) ABSTRACT A drive load measuring system for a conveyor-type oven is disclosed. According to one embodiment, a drive load measuring system includes: a pair of mounting assemblies that support opposing end portions of a rotating drive shaft of an oven drive unit; and a PLC control unit operatively connected to the mounting assemblies. The mounting assemblies each include a pivot bracket mounted to the body of the oven and a force sensing fastener inserted into the pivot bracket and configured to generate an output signal representative of the load on the force sensing fastener. The PLC control unit can be configured to calculate load values of the force sensing fasteners and to detect rapid changes in the load values that may indicate jam-ups of conveyors driven by the oven drive unit. Alternatively, the PLC control unit can be configured to detect when load values of the force sensing fasteners exceed a threshold value, which may also indicate jam-ups of the conveyors. According to another embodiment, a drive load measuring system includes a pair of in-line torque sensors attached to a rotating drive shaft of an oven drive unit at or near end portions of the drive shaft; and a PLC control unit operatively connected to the mounting assemblies.

26 Claims, 8 Drawing Sheets

OVEN DRIVE LOAD MONITORING SYSTEM

CROSS REFERENCE TO RELATED APPLICATIONS

This application is a continuation-in-part of PCT Application No. PCT/US08/077789, filed on Sep. 26, 2008, which PCT application claims priority to U.S. Provisional Application No. 60/978,005, filed on Oct. 5, 2007; and U.S. Provisional Application No. 60/975,618, filed on Sep. 27, 2007. This application also claims the benefit of U.S. Provisional Application No. 61/157,707, filed Mar. 5, 2009, and U.S. Provisional Application No. 61/160,455, filed Mar. 16, 2009.

FIELD OF THE DISCLOSURE

This disclosure relates generally to commercial ovens and more specifically to large baking ovens incorporating an endless conveyor for conveying items through the oven and a system for monitoring the mechanical integrity of the large baking oven.

BACKGROUND

Certain types of industrial ovens, such as tray ovens or tunnel ovens, employ oven drive units including endless conveyors or roller chains that carry goods through the interior of the oven. In such ovens, the oven drive unit and other parts of the oven are susceptible to damage caused by jam-ups due to failure of mechanical components, interference between moving parts and misfeeding of goods, for example. When such problems occur, it is critical that they are detected quickly so that the oven drive unit can be shut down, paused or slowed down in order to prevent or minimize damage to the oven.

SUMMARY

Disclosed is a system for monitoring the mechanical integrity of large industrial baking ovens by the measurement of strain in an oven drive element or elements subject to stress during operation of the oven. Mechanical integrity of industrial oven drive mechanisms can be compromised in numerous ways. For example, poor preventive maintenance practices, such as lack of chain lubrication, drive mechanism element failure, interference between moving parts, or the mis-feeding of product to name but a few.

Briefly described, in accordance with a first embodiment thereof, a baking oven having an endless conveyor is disclosed. The baking oven comprises an oven drive mechanism that moves an endless conveyor between a drive end and a feed end. The oven drive mechanism is comprised of a plurality of drive elements (e.g. an endless conveyor, drive motor, main drive shafts, belts, pulleys, chains, and gears) that extend from the drive end to the feed end. The endless conveyor carries goods through the oven.

This disclosure also relates to an oven drive load measuring system. According to another embodiment, an oven drive unit includes a main drive shaft and a main drive motor operatively connected to turn the main drive shaft. The drive system further includes a pair of conveyor drive sprockets respectively driven off of opposing end portions of the shaft. The conveyor drive sprockets may drive various components of the oven, including respective endless conveyors or roller chains located at opposite sides of the oven for feeding goods through the oven.

The oven drive load measuring system includes a pair of mounting assemblies disposed on the body of the oven and supporting the end portions of the main drive shaft. Each of the mounting assemblies includes a mounting bracket attached to the body of the oven and a pivot bracket attached to the mounting bracket. Each pivot bracket extends perpendicularly to the rotational axis of the drive shaft and supports one or more shaft bearings that support the main drive shaft. A first end of each pivot bracket is pivotally connected to a first end of the respective mounting bracket by a force sensing fastener, and a second end of each pivot bracket is connected to a second end of the respective mounting bracket by one or more pivot pins. The force sensing fasteners may be electrically connected to a programmable logic controller (PLC) control unit, which forms part of the drive load measuring system.

During operation of the oven drive unit, the driving of the conveyor drive sprockets produces forces that act on the pivot brackets and thereby place loads on the force sensing fasteners. The force sensing fasteners produce electronic output signals that are proportional to their respective loads. Thus, the force sensing fasteners indicate the forces required to pull the conveyors at each side of the oven. The PLC control unit can monitor the force values generated by the force sensing fasteners, and can determine the presence of jam-ups on either side of the oven based on the magnitudes of the force values, or based on rapid changes in the force values. If a jam-up is detected on either side of the oven, the PLC control unit can shut down, pause or slow down the drive motor until the problem is addressed.

According to another embodiment, the main drive shaft is supported on the oven body by static mounting members. A drive load measuring system including a pair of in-line torque sensors and a PLC control unit operatively connected to the torque sensors is provided. The in-line torque sensors are mounted on the main drive shaft at or near end portions of the main drive shaft, and produce electronic output signals that are proportional to respective loads on the end portions of the main drive shaft.

According to yet another embodiment, a baking oven is disclosed comprising an oven drive mechanism that moves an endless conveyor between a drive end and a feed end of the baking oven. The baking oven further comprises a monitoring system for monitoring integrity of the oven drive mechanism and controlling motion of the oven drive mechanism. The monitoring system comprises a first sensor configured to sense strain in a first element of the oven drive mechanism and a second sensor configured to sense strain in a second element of the oven drive mechanism. The second element may be a mounting bracket assembly supporting a feed end shaft of the feed end. A second sensor is provided and is in communication with the control system. The second sensor is configured to sense strain in the second element.

The disclosures, including specifications, claims and drawings, of patent application PCT/US08/077789 and US provisional patent applications 60/978,005, 60/975,618, 61/157,707, and 61/160,455 are incorporated herein by reference in their entirety.

Other features and advantages of the invention will become apparent from the following description and drawings.

DETAILED DESCRIPTION

The following description contains various directional terms in the context of an oven, including "longitudinal", "lateral", "left" and "right" directions. It should be understood that such terms are provided to facilitate understanding of the description, and are not intended to be limiting. For example, the left direction may be considered the right direction and vice-versa, or the longitudinal direction may be considered the lateral direction, and vice-versa, depending on the configuration of the oven.

Figure 1:
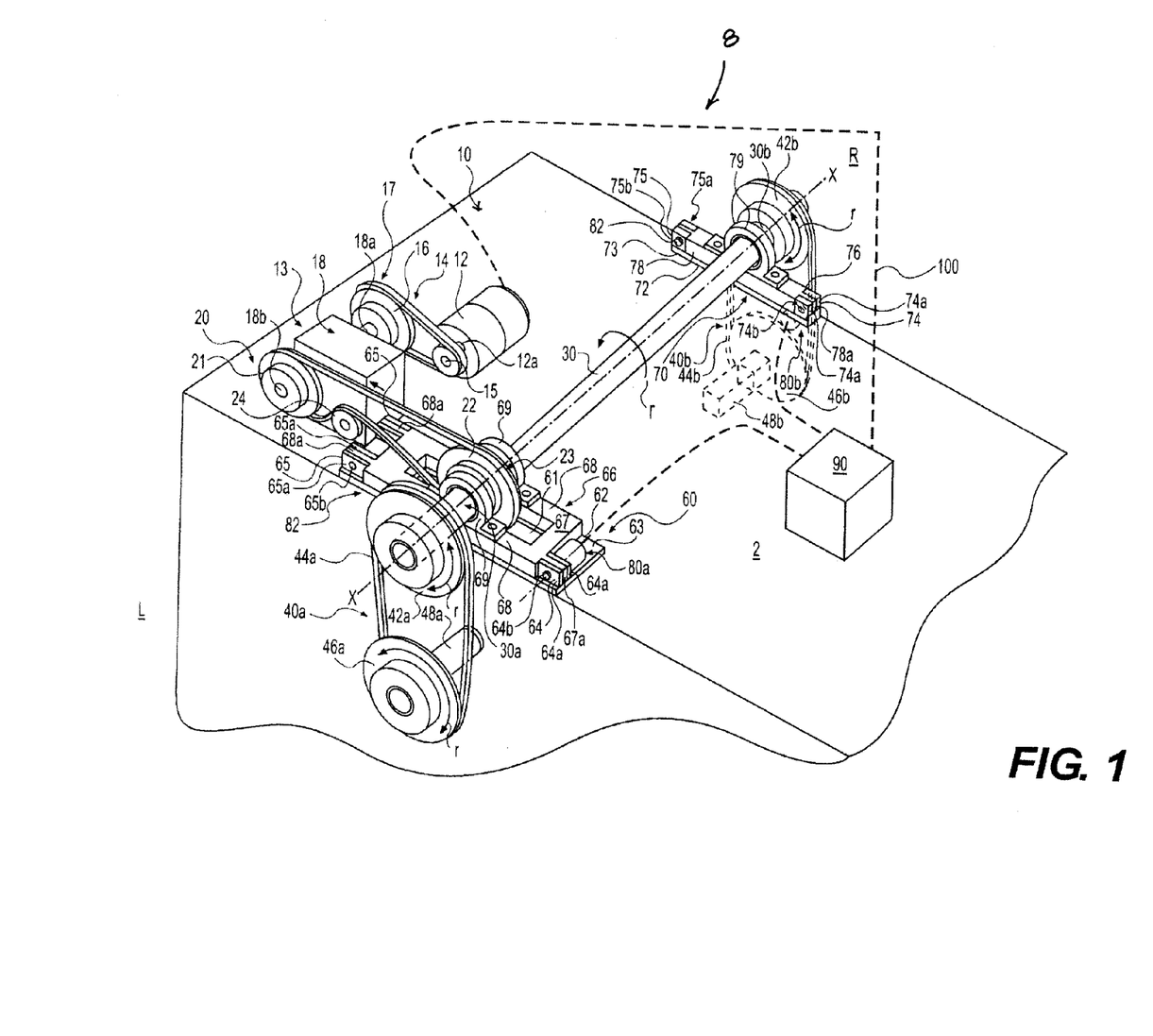
FIG. 1 is a partial perspective view showing an oven drive unit of an oven drive mechanism, including a drive load measuring system, according to a first exemplary embodiment of the disclosure.

FIG. 1 shows an embodiment of an oven drive unit 10 mounted to the body 2 of an oven. The oven drive unit 10 and all of its various component parts are elements of an oven drive mechanism 8. The oven drive mechanism 8 also includes, among other elements, an endless conveyor 5 (FIG. 4) and, in some embodiments, a sliding take-up assembly 300 (FIG. 5). The oven includes a drive end 3 (FIGS. 1, 3, 4) and a feed end 4 (FIG. 5), located proximate opposite ends of the body 2.

According to one embodiment, the oven drive unit 10 includes a drive motor 12 operatively connected to drive a main drive shaft 30, located proximate the drive end 3. The main drive shaft 30 is operatively connected to drive an endless conveyor 5, or to drive a pair of endless conveyors or roller chains (not shown) at the left and right sides L, R of the oven via a pair of conveyor drive belt assemblies or drive chain assemblies 40. The drive shaft 30 may be considered a "cross" drive shaft, as it extends laterally across the oven body 2, transverse to the direction in which the conveyors are driven.

The drive motor 12 may drive the drive shaft 30 through a transmission 13. By way of example, the transmission 13 may include a gearbox 18, a first transmission belt assembly 14 connecting an output shaft 12a of the motor 12 to the input shaft 18a of gearbox 18, and a second transmission belt assembly 20 connecting an output shaft 18b of the gearbox 18 to the main drive shaft 30.

The transmission belt assembly 14 may include a motor output sprocket 15 attached to the output shaft 12a, a gearbox input sprocket 16 attached to the gearbox input shaft 18a and a belt 17 connecting the sprockets 15, 16. The transmission belt assembly 20 may include a gearbox output sprocket 21 attached to the output shaft 18b, a main drive shaft input sprocket 22 attached to a first end portion 30a of the main drive shaft 30, a belt 23 connecting the sprocket 21 to the sprocket 22, and a belt tensioning sprocket 24. According to one example, representative of the 970 Oven manufactured and sold by Turkington USA of Clayton, N.C., the drive motor 12 may be a 5 HP, 1160 rpm motor with a brake, and the belt assembly 14, gearbox 18, and drive assembly 20 may have gear reduction ratios of 3.5:1, 76:1 and 2.3:1, respectively. However, many other configurations and components are possible for the transmission 13.

The conveyor drive belt assemblies 40a, 40b are respectively driven off of the left and right end portions 30a, 30b of the main drive shaft 30. The drive belt assemblies 40a, 40b respectively include main drive shaft output sprockets 42a, 42b respectively mounted on the end portions 30a, 30b, conveyor drive sprockets 46a, 46b mounted on respective conveyor stub shafts 48a, 48b and belts 44a, 44b respectively connecting the sprockets 42a, 42b to the sprockets 46a, 46b. The conveyor stub shafts 48a, 48b respectively drive the left and right conveyors (not shown) for transporting goods (not shown) through the oven. It should be understood that, although the assemblies 14, 20, 40a, 40b are described as including belts and sprockets, other variations of the assemblies 14, 20, 40a, 40b are possible. For example, the assemblies 14, 20, 40a, 40b may include chains instead of belts and/or wheels instead of sprockets. Alternatively, the assemblies 14, 20, 40a, 40b may be replaced by beltless assemblies including intermeshed gears.

Figure 2:
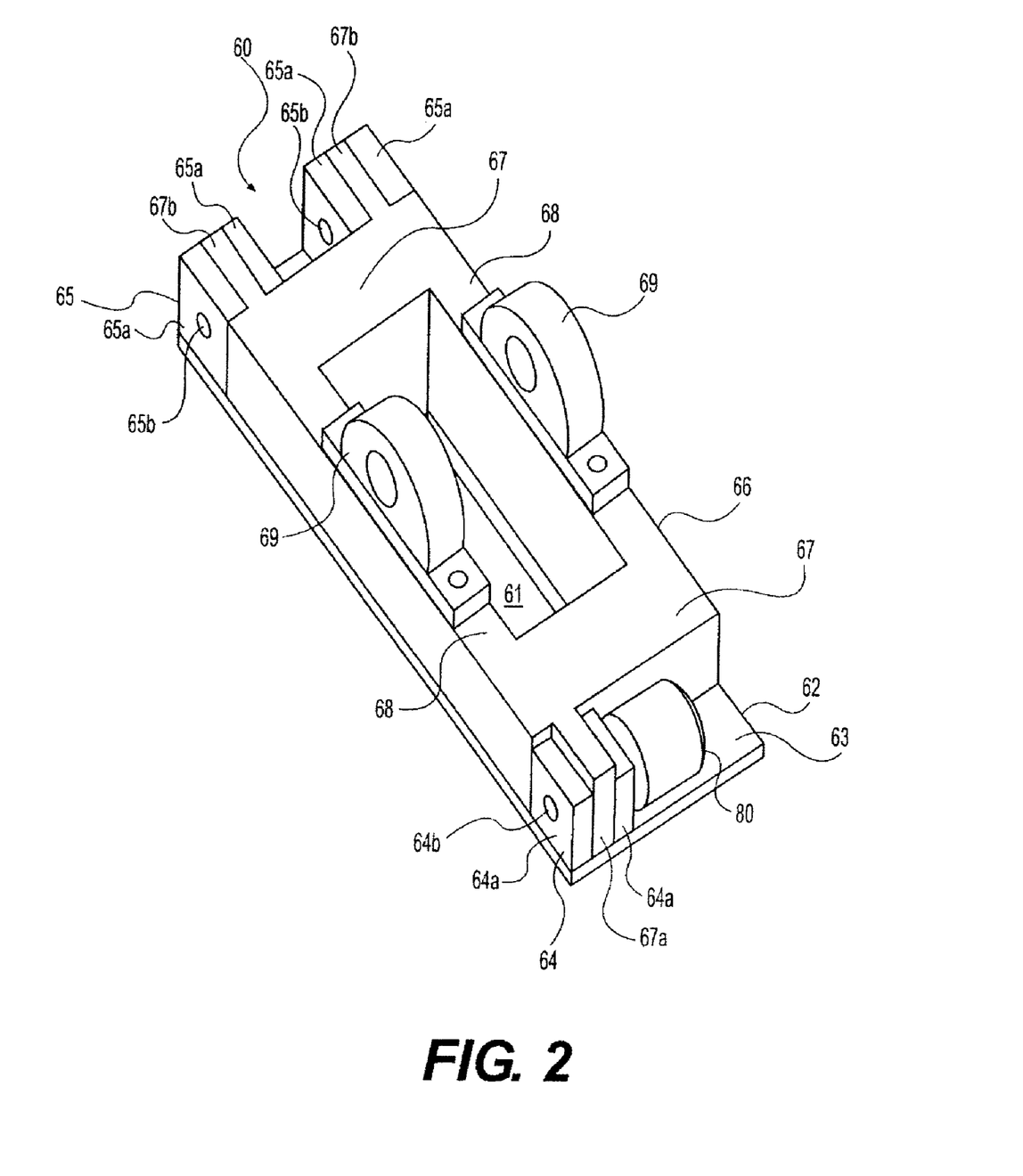
FIG. 2 is a perspective view of a mounting assembly for a main drive shaft of the oven drive unit, according to the embodiment of FIG. 1.

As shown in FIGS. 1 and 2, the left end portion 30a of the main drive shaft 30 is supported by a first mounting assembly 60 including a mounting bracket 62 attached to the oven body 2, a pivot bracket 66 connected to the mounting bracket 62, and a pair of shaft bearings 69 attached to the pivot bracket 66. The mounting bracket 62 includes a base member 63 and connection members 64, 65 attached to the base member 63. Each of the connection members 64, 65 includes a pair of laterally spaced arms 64a, 65a with mounting holes 64b, 65b. One connection member 64 is positioned near a first end of the base member 63 and two connection members 65 are positioned near a second, opposite end of the base member 63 such that the connection member 64 and the connection members 65 are disposed on opposite sides of the main drive shaft 30 in the direction transverse to the longitudinal axis X of the main drive shaft 30.

The pivot bracket 66 extends perpendicularly to the rotational axis X of the main drive shaft 30 and includes a pair of laterally spaced, longitudinally extending members 68 connected by a pair of longitudinally-spaced, laterally extending members 67 located on the first and second sides of the drive shaft 30. The pivot bracket 66 is generally rectangular in shape, and has an interior open space 61 defined within the inner sides of the members, 67, 68. The bearings 69 are mounted on the longitudinally extending members 68 and support the end portion 30a of the shaft 30 at locations on opposite sides of the main drive shaft input sprocket 22. The space 61 between the members 67, 68 provides clearance in the pivot bracket 60 for the main drive shaft input sprocket 22.

The laterally extending member 67 attached to the first ends of the longitudinally extending members 68 includes a flange 67a which is inserted into the connection member 64 and secured thereto by a first force sensing fastener 80a, which is inserted through the mounting holes 64b in the arms 64a and a corresponding hole (not shown) in the flange 67a. Laterally spaced flanges 67b, which are provided on the laterally extending member 67 attached to the second ends of the longitudinally extending members 68, are respectively inserted into the connection members 65 and secured thereto by pivot pins 82 inserted into the mounting holes 65b of the arms 65a and a corresponding hole (not shown) in the flanges 67b. The respective assemblies of connection members 65, flanges 67b and pins 82 form a double pivot connection at the second end of the mounting bracket 63, while the assembly of the connection member 64, the flange 67a and the first force sensing fastener 80 form a load measuring connection at the first end of the mounting bracket 63.

A second mounting assembly 70 supports the right end portion 30b of the main drive shaft 30. The second mounting assembly 70 includes a mounting bracket 72 attached to the oven body 2, a pivot bracket 76 connected to the mounting bracket 72, and a shaft bearing 79 attached to the pivot bracket 76. The mounting bracket 72 includes a base member 73, a connection member 74 attached to a first end of the mounting bracket 72 and a connection member 75 attached to a second end of the base member 73 opposite the first end of the base member 73. Thus, the connection members 74, 75 are disposed on opposite sides of the main drive shaft 30, and correspond to the connection members 64 and 65, respectively, of the mounting bracket 62. Each of the connection members 74, 75 includes a pair of laterally spaced arms 74a, 75a with mounting holes 74b, 75b.

The pivot bracket 76 extends perpendicularly to the rotational axis X of the main drive shaft 30 and includes a longitudinally extending member 78 and flanges 78a, 78b located at first and second ends of the longitudinally extending member 78. The bearing 79 is mounted on the longitudinally extending member 78 and supports the end portion 30b of the main drive shaft 30. The flange 78a is inserted into the connection member 74 and is secured to the connection member 74 by a second force sensing fastener 80b which is inserted through the holes 74b in the arms 74a and a corresponding hole (not shown) in the flange 78a. The flange 78b is inserted into the connection member 75 and is secured thereto by a pivot pin 82 which is inserted through the holes 75b in the arms 75a. The assembly of connection member 75, the flange 78b and the pin 82 forms a single pivot connection at the second end of the mounting bracket 73.

The force sensing fasteners 80a, 80b may be strain pins (such as Clevis strain pins), strain bolts, or other suitable types of fasteners which include strain gauges that generate an electrical signal proportional to a force applied to fasteners. Examples of suitable fasteners include, but are not limited to, the various force sensing pins and bolts manufactured by Strainsert Company of Conshohocken, Pa. As shown in FIG. 1, the force sensing fasteners 80 may be connected to a PLC control unit 90, which may be a main PLC control unit for the oven or an independent PLC control unit. The PLC control unit 90 may be connected to the drive motor 12 and configured to control the operation of the drive motor 12 based in part on the electrical signals output by the force sensing fasteners 80. The mounting assemblies 60, 70, the force sensing fasteners 80 and the PLC control unit 90 combine to form a drive load measuring system 100, the operation of which is described below.

When the drive motor 12 is running, it rotates the main drive shaft 30, the sprockets 22, 42a, 42b, 46a, 46b and the stub shafts 48a, 48b in the direction r, as shown in FIG. 1. The driving of the conveyor drive sprockets 46a, 46b and the stub shafts 48a, 48b produces pulling forces on the bearings 69, 79 and the pivot brackets 66, 76, which in turn place loads on the force sensing fasteners 80a, 80b. The force sensing fasteners 80 generate electrical output signals that are proportional to the loads placed on them. Based on the load-proportional output signals of the force sensing fasteners 80a, 80b, the PLC can be programmed to calculate load values of the force sensing fasteners 80a, 80b. The PLC control unit 90 may also be programmed to continuously monitor the load values and to detect rapid changes in the load values. A rapid change in the load value of one of the force sensing fasteners 80a, 80b may indicate a jam-up on the respective left or right conveyor. Thus, the PLC control unit 90 can be programmed to either stop, pause or slow down the motor 12 when the PLC control unit 90 detects a rapid change in the load value of one of the force sensing fasteners 80a, 80b (i.e., the magnitude of the load has changed by a specified amount within a specified time interval). Alternatively, the PLC control unit 90 can be programmed to either stop, pause or slow down the motor 12 when the PLC control unit 90 detects that the load value of either force sensing fastener has exceeded a predetermined threshold value, which may also be indicative of a jam-up. By monitoring the load values and/or changes in the load values of two different force sensing fasteners 80a, 80b associated with the left and right conveyors, the PLC control unit can also determine which conveyor may be experiencing a jam-up.

Figure 3:
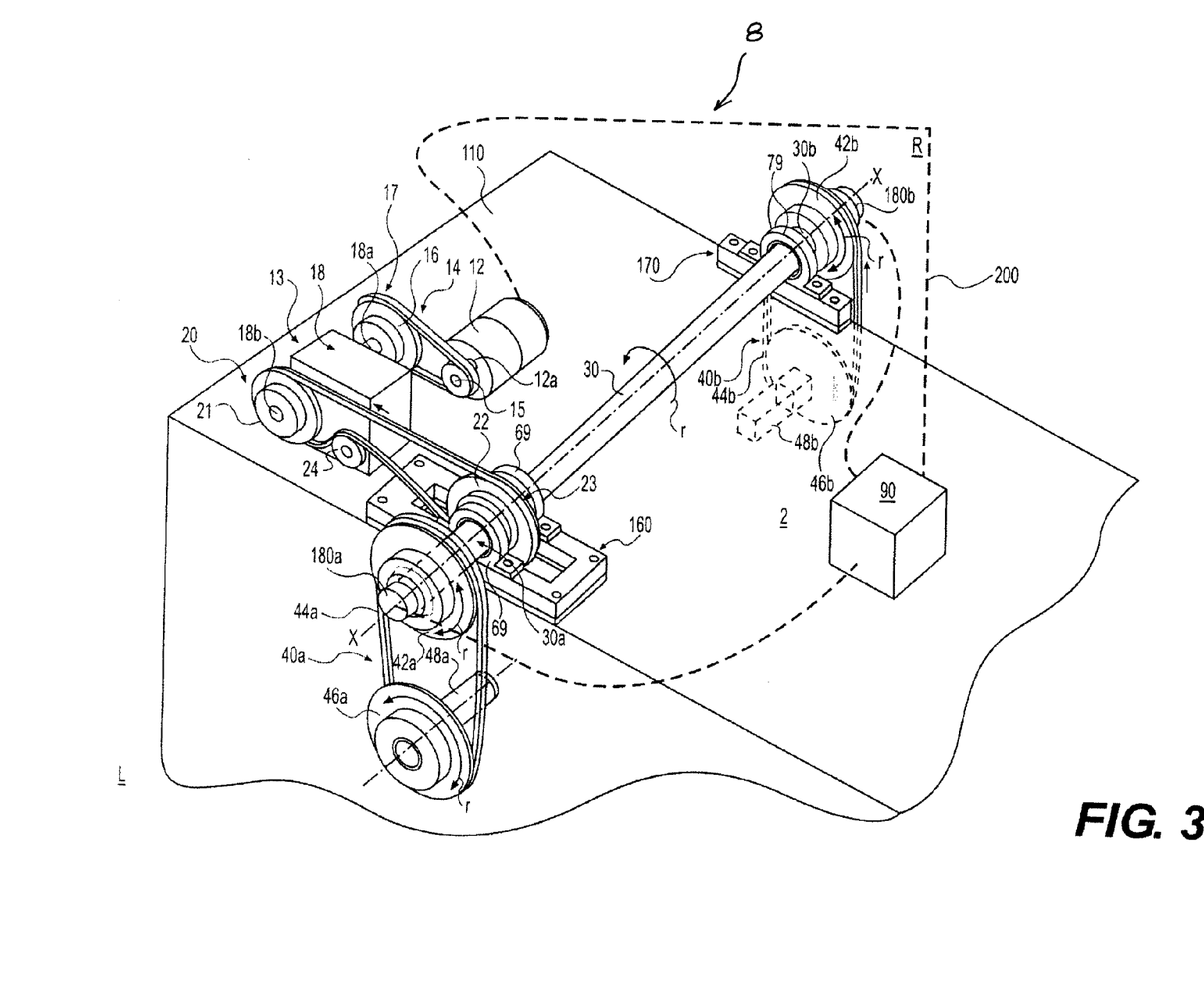
FIG. 3 is a partial perspective view showing the oven drive unit of FIG. 1, including a drive load measuring system, according to a second exemplary embodiment of the disclosure.

FIG. 3 shows an oven drive unit 110 according to another embodiment. The oven drive unit 110 is similar to the oven drive unit 10 according to the previous embodiment, as indicated by repeated reference characters, except that the oven drive unit 110 includes static mounting members 160, 170 attached to the oven body 2, and a drive load measuring system 200 including a PLC 90 and in-line rotary torque sensors 180a, 180b. The mounting member 160 supports the shaft bearings 69, and the mounting member 170 supports the shaft bearing 79. The mounting members 160, 170 have no moving parts and are statically attached to the oven body 2. The torque sensors 180 may be strain gauges mounted directly to the drive shaft 30 with slip rings, or strain gauges otherwise coupled to the drive shaft 30. One example of such in-line torque rotary sensors is the Rotary Torque Sensor by Sensotec-Lebow, a Division of Honeywell Sensing and Control of Columbus, Ohio. As shown in FIG. 3, torque sensors 180a, 180b are mounted at or near respective end portions 30a, 30b of the drive shaft 30 so as to couple the respective conveyor drive belt assemblies 40a, 40b to the drive shaft 30. The torque sensors 180a, 180b are connected to the PLC 90 for sending electrical output signals to the PLC that are proportional to the torque loads on the ends of the drive shaft 30.

Figure 4:
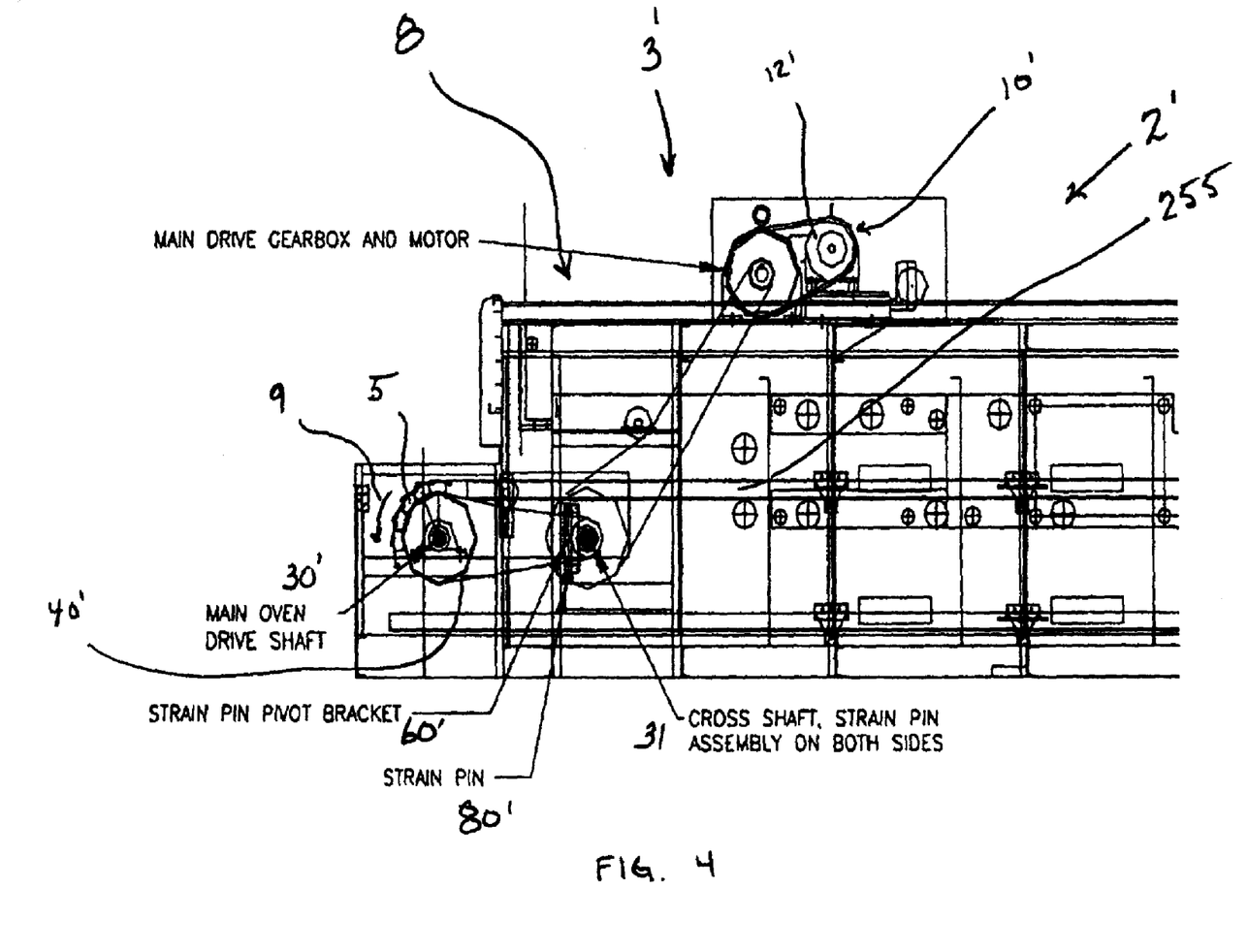
FIG. 4 is a side view showing a drive end of an oven and an oven drive unit of an alternate type, including elements of a drive load measuring system, according to a third exemplary embodiment of the disclosure.
Figure 5:
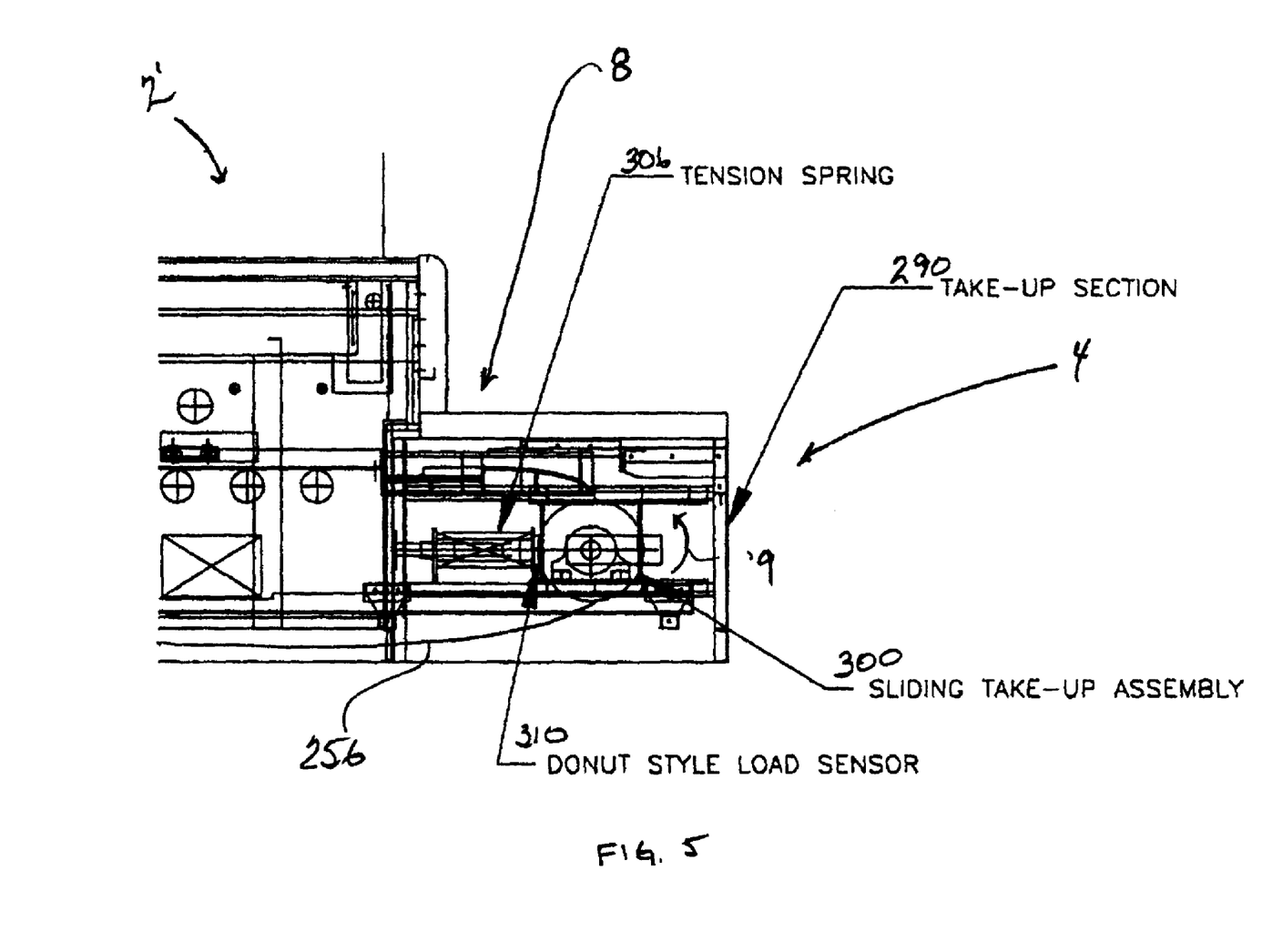
FIG. 5 is a side view showing a feed end of an oven according to an exemplary embodiment of the disclosure.

FIG. 4 is a side view showing a drive end 3' of an oven and an oven drive unit of an alternate type, including elements of a drive load measuring system, according to a third exemplary embodiment of the disclosure. An oven drive mechanism 8 is identified and is comprised of an endless conveyor 5 and all the elements necessary to drive the endless conveyor 5. The drive end 3' includes an oven drive unit 10', which includes a drive motor 12' operatively connected to drive a main drive shaft 30', located proximate the drive end 3'. The main drive shaft 30' is operatively connected to the endless conveyor 5 or roller chain (not shown) via a conveyor drive belt assembly 40' or drive chain assembly 40'. A first portion 255 of the endless conveyor may extend from the feed end 4' (FIG. 5) to the drive end 3' and a second portion 256 (FIG. 5) may extend from the drive end 3' to the feed end 4'. The first portion 255 and the second portion 256 are substantially parallel. A cross drive shaft 31 and main drive shaft 30' extend laterally across the oven body 2', transverse to the direction in which the endless conveyor 5 is driven. In this embodiment, the endless conveyor travels in a counter-clockwise direction 9. The main drive shaft 30' is supported by a mounting assembly 60', which is attached to the oven body 2'. Although disclosed as a single mounting assembly 60', it is understood by the skilled artisan that each end of the main drive shaft 30 is supported by a respective mounting assembly 60'. The mounting assembly 60' includes a pivot bracket 66 (not shown) and a strain sensor 80'. The term strain sensor 80' is a general term and may include, without limitation, a strain pin 80', a force sensing fastener 80', or a load sensing clevis pin 80'. The mounting assembly 60' senses strain under the same principles as the mounting assembly 60 previously discussed within this document.

FIG. 5 is a plan view of the feed end 4 of an oven of any of the foregoing drive end embodiments. The feed end 4 of the oven includes a take-up section 290, which comprises a take-up assembly 300. The feed end 4 may include a portion of oven drive mechanism 8. The take-up assembly 300 monitors a load or a strain in the endless conveyor and in a portion of the endless conveyor that is known as a return path. The return path is the path from the drive end to the feed end 4, in the direction of endless conveyor motion. The take-up assembly 300 includes a spring element 306 to maintain a tension in the endless conveyor and a load sensor 310, which may be a "donut" style load sensor. A donut style load cell is essentially a circular load cell.

In principle, the load sensor 310 associated with the feed end 4 and the various sensors associated with the drive end 3, 3' perform the same function, which is to monitor a load (i.e. a strain or a force) in the oven drive mechanism 8, and in particular, a load in the endless conveyor 5. The feed end sensor 310 (FIG. 5) and the respective drive end sensor (e.g. 80, 80', or 80" of FIGS. 1, 3, 4) are in communication with a common PLC control unit 90 (for example, that of FIG. 1), or may be in communication with separate PLC control units.

Figure 6:
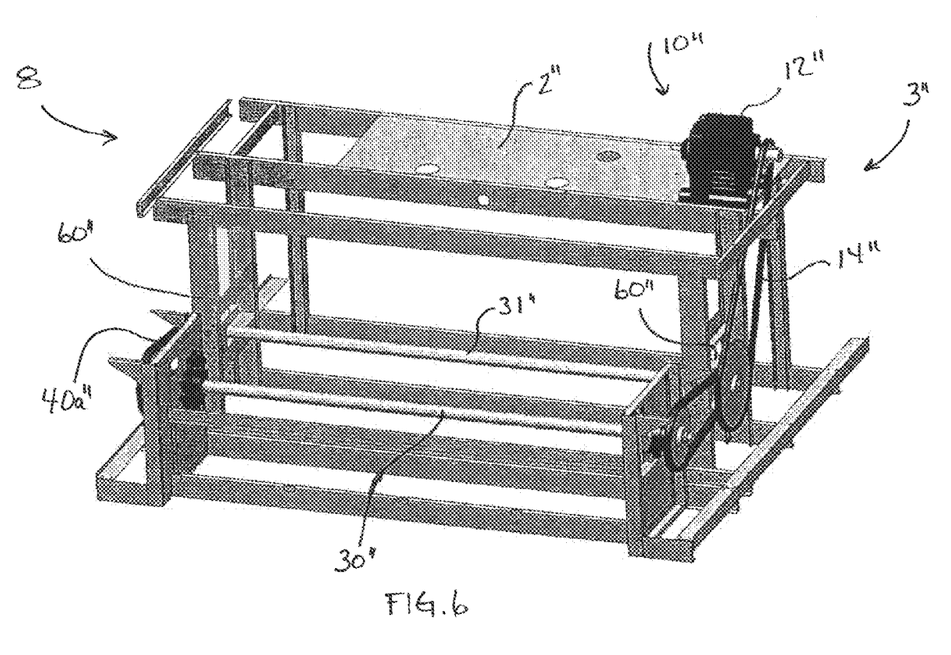
FIG. 6 is a perspective view showing a drive end of an oven drive mechanism, according to a fourth embodiment of the disclosure.

FIG. 6 is a perspective view of a drive end 3" of an oven drive unit 10", according to a fourth embodiment of the disclosure. The drive end 3" includes an oven drive unit 10", which includes a drive motor 12" operatively connected to drive a main drive shaft 30", located proximate the drive end 3". A first transmission belt assembly 14" connects an output shaft of the motor 12" to a cross drive shaft 31". The cross drive shaft 31" is operatively connected the main drive shaft 30" via a conveyor drive belt assembly or drive chain assembly 40a". In this embodiment, the cross drive shaft 31" is supported by mounting assemblies 60", which attach to the oven body 2".

Figure 7:
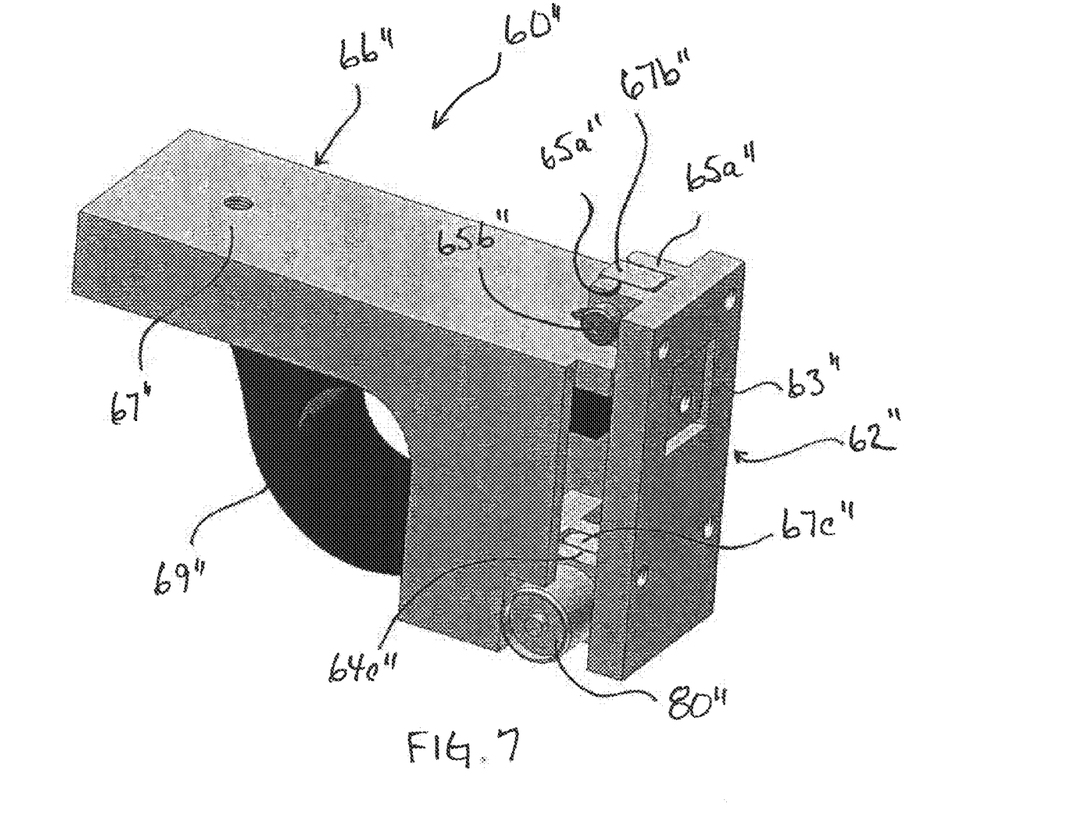
FIG. 7 is a perspective view showing a mounting assembly of FIG. 6.

FIG. 7 shows in more detail the mounting assembly 60" of FIG. 6. The mounting assembly 60" operates under the same principle and theory as mounting assembly 60 discussed in connection with FIGS. 1 and 2. The mounting assembly 60" includes a mounting bracket 62' attached to the oven body (not shown), a pivot bracket 66" connected to the mounting bracket 62", and a shaft bearing 69" attached to the pivot bracket 66". The mounting bracket 62" includes a base member 63" and connection members 64a", attached to the base member 63".

A bearing 69" is mounted on laterally extending member 67" and supports the end portion of the cross drive shaft 31". Attached to an end of the laterally extending member 67" is a flange 67b", which is inserted between the connection member 65a" and secured thereto by a pin 65b". A first force sensing fastener 80", or load sensing system 80", is inserted through the mounting holes (not shown) in the arms 64c" and a corresponding hole (not shown) in the flange 67c".

The force sensing fastener 80" may be strain pins (such as Clevis strain pins), strain bolts, or other suitable types of fasteners which include strain gauges that generate an electrical signal proportional to a force applied to fasteners. Examples of suitable fasteners include, but are not limited to, the various force sensing pins and bolts manufactured by Strainsert Company of Conshohocken, Pa. The force sensing fasteners 80" may be connected to a PLC control unit 90 (FIG. 1).

Figure 8:
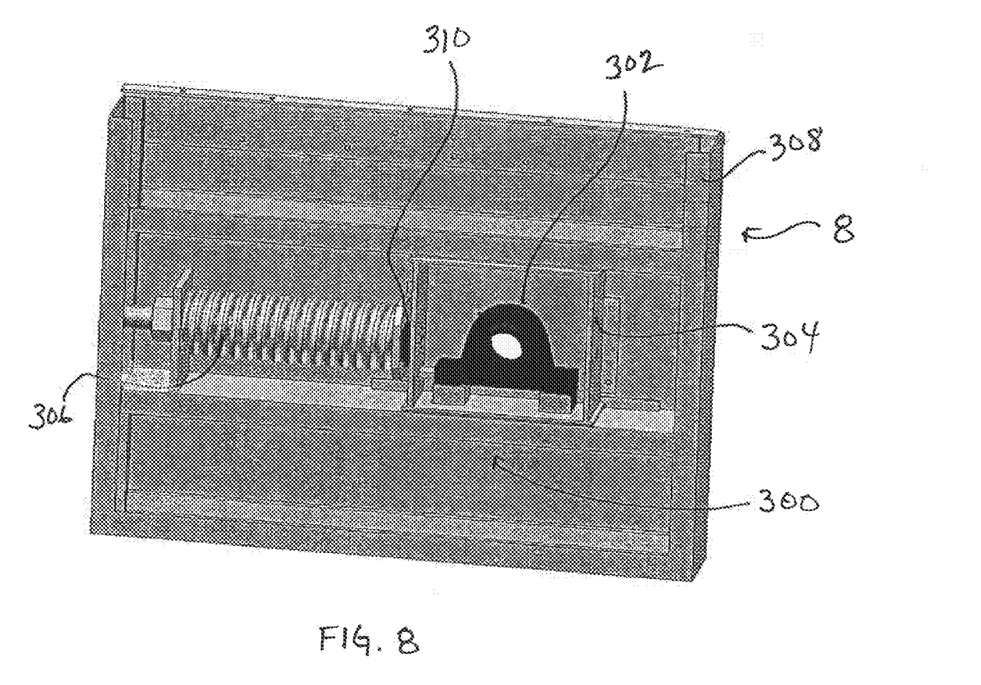
FIG. 8 is a perspective showing an oven drive mechanism that includes a take-up assembly, according to a fifth embodiment of the disclosure.

FIG. 8 shows a feed end load sensor 310 of an oven drive mechanism 8, which includes a take-up assembly 300, according to a fifth embodiment of the disclosure. The take-up assembly 300 includes a journal 302 that is mounted to a movable frame 304. The moving frame 304 is connected to a spring 306, which is connected to a frame 308 of the feed end 4. The strain sensing element 310 is disposed between the spring 306 and the movable frame 304 and senses strain in the oven drive mechanism 8. The strain sensing element 310 may also be a "donut" style load sensor and may be in communication with the PLC control unit 90, or a stand alone control unit. The spring 306 functions to maintain tension in the oven drive mechanism 8 and limit movement of moving frame 304. The feed end sensor 310 is designated as a feed end sensor because it is arranged proximate the feed end 4. However, a sensor that performs the same function as the feed end sensor 310 may be arranged proximate the drive end 3, thus eliminating the need for a sensor at the feed end 4. Furthermore, in alternate embodiments, the take-up assembly 300 may also be arranged proximate the drive end 3.

According to one aspect, only a drive end load sensing system is used to monitor the drive mechanism. Alternatively, two distinct load sensing systems (drive end load sensing system and feed end load sensing system) may be necessary because the load sensing system 80, 80', 80" of the drive end 3" may primarily monitor the load in the first portion 255 of the endless conveyor 5 and the load sensing system 310 at the feed end 4 may primarily monitor the load in the second portion 256 of the endless conveyor 5. Because of the arrangement of the load sensing system 310 at the feed end 4, if an increase in load occurs on the return path (i.e., the second portion 256), the tension in the feed end 4 will rise rapidly before a large increase in the tension of the oven drive mechanism 8 is experienced. Conversely, because of the arrangement of the load sensing system 80" at the drive end 3, if an increase in load occurs on the feed path (i.e., the first portion 255), the tension in the drive end 3 will rise rapidly before a large increase in the tension of the oven drive mechanism 8 is experienced.

The disclosure has been described with respect to specific embodiments that exhibit features and aspects of the disclosure and that represent a best mode of carrying out the disclosure. The invention itself, however, is broader than the specifics of the illustrated embodiments. For example, while the sensors in the illustrated embodiments have been shown measuring a force indicative of the stress in the endless conveyor members, they also may measure a force imparted to virtually any element of the drive mechanism. For instance, sensors may measure the force conveyed to the drive shaft, to the various pulleys and/or sprockets of the drive chain, the transmission and gear box, or the motor shaft. Indeed, virtually any element of the drive mechanism that experiences changing forces during operation of the endless conveyor may be suitable. The illustrated pivot brackets and strain fasteners provide a convenient way of measuring the stain on elements of the oven drive mechanism, in this case the endless conveyor, or conveyors. However a number of different types of sensors might be substituted such as torque sensors (as described above), various strain sensors, and the like.

It will be understood by those skilled in the art that while the present invention has been discussed above with reference to exemplary embodiments, various additions, modifications and changes can be made thereto without departing from the spirit and scope of the invention as set forth in the following claims. For example, although the representative embodiments herein may include a pair of conveyor drive belt assemblies connected to opposite ends of a drive shaft, or opposite ends of the oven drive mechanism, the number and position of the drive belt assemblies and associated strain sensing devices and/or associated torque sensing devices may be varied as desired. Furthermore, the drive belt assemblies may be replaced by other types of drive assemblies, including, but not limited to, beltless assemblies including intermeshed toothed gears or chain drive assemblies.

I claim:

1. In a baking oven comprising an oven drive mechanism that moves an endless conveyor between a drive end and a feed end of the baking oven, the endless conveyor for carrying goods through the oven, a monitoring system for monitoring integrity of the oven drive mechanism and controlling motion of the oven drive mechanism, the monitoring system comprising:
   a first sensor configured to sense a strain in a first element of the oven drive mechanism and to output a first electrical signal reflective of the strain, wherein the strain in the first element is indicative of drive load experienced by the oven drive mechanism; and
   a programmable control system in electrical communication with the first sensor, wherein the programmable control system is configured to continuously monitor the first electrical signal to detect a change in strain sensed by the first sensor, and wherein the programmable control system is configured to control the motion of the oven drive mechanism according to the change in strain in the first element.

2. The monitoring system according to claim 1, wherein the first element of the oven drive mechanism comprises a portion of a mounting bracket assembly supporting a main drive shaft of the oven drive mechanism proximate the drive end of the baking oven.

3. The monitoring system according to claim 1, wherein the first element of the oven drive mechanism comprises a portion of a mounting bracket assembly supporting a feed end shaft of the oven drive mechanism proximate the feed end of the baking oven.

4. The monitoring system according to claim 1, wherein the first sensor comprises a torque sensor mounted inline to a drive shaft of the oven drive mechanism.

5. The monitoring system according to claim 1, further comprising:
   a second sensor configured to sense a strain in a second element of the oven drive mechanism and to output a second electrical signal reflective of the strain, wherein the strain in the second element is indicative of drive load experienced by the oven drive mechanism; and
   the programmable control system in electrical communication with the second sensor, wherein the programmable control system is configured to continuously monitor the first and second electrical signals to detect changes in strain sensed by the first and the second sensors and control the motion of the oven drive mechanism based on the changes in strain sensed by the first and second sensors.

6. The monitoring system according to claim 2, wherein the mounting bracket assembly comprises a base mounting bracket having a first end and a second end, and a pivot bracket extending perpendicularly to a rotational axis of the main drive shaft and attached to the base mounting bracket.

7. The monitoring system according to claim 6, wherein:
   the pivot bracket is attached to the first end of the base mounting bracket using a pivot connection; and
   the pivot bracket is attached to the second end of the base mounting bracket using a strain sensing connection that includes the first sensor.

8. The monitoring system according to claim 7, wherein the first sensor comprises a pin-type strain sensor.

9. The monitoring system according to claim 2, further comprising:
   a second element of the oven drive mechanism comprising a portion of a mounting bracket assembly supporting a feed end shaft proximate the feed end of the baking oven; and
   a second sensor in electrical communication with the programmable control system and configured to sense a strain in the second element and to output a second electrical signal reflective of the strain, wherein the strain in the second element is indicative of drive load experienced by the oven drive mechanism.

10. The monitoring system according to claim 9, wherein the first sensor senses strain in a first portion of the endless conveyor and the second sensor senses strain in a second portion of the endless conveyor.

11. The monitoring system according to claim 10, wherein the first portion of the endless conveyor and the second portion of the endless conveyor are generally parallel to one another.

12. An oven comprising:
    an oven body;
    an oven drive mechanism mounted to the oven body and including at least a drive unit and an endless conveyor arranged to move through the oven;
    at least one sensor coupled to the oven drive mechanism configured to sense a force applied to at least one element of the oven drive mechanism and to produce electrical signals proportional to the sensed force, the force being indicative of drive load experienced by the oven drive mechanism; and
    a control unit in electrical communication with the at least one sensor to receive the electrical signals produced by the at least one sensor,
    the control unit being programmed to continuously monitor the received electrical signals and to change operation of the oven drive mechanism when the received electrical signals meet predetermined criteria indicating an undesirable change in drive load of the oven drive mechanism.

13. The oven as claimed in claim 12 and wherein the at least one element comprises the endless conveyor.

14. The oven as claimed in claim 13 and wherein the endless conveyor comprises a left conveyor member and a right conveyor member, and wherein the at least one sensor senses a force indicative of a drive load experienced by at least one of the left and right conveyor members.

15. The oven as claimed in claim 14 and wherein the at least one sensor comprises a first sensor arranged to sense a force indicative of drive load in the left conveyor member and a second sensor arranged to sense a force indicative of drive load in the right conveyor member.

16. The oven as claimed in claim 13 and wherein the oven drive mechanism further includes a drive shaft rotatably coupled to the endless conveyor and the at least one element comprises a portion of a mounting bracket assembly within which the drive shaft is rotatably journaled, the at least one sensor being arranged to sense a force applied to the portion of the mounting bracket assembly as an indication of load in the endless conveyor.

17. The oven as claimed in claim 16 and wherein the mounting bracket assembly comprises a base mounting bracket and a pivot bracket, and wherein the at least one sensor senses a pivoting force imparted to the pivot bracket.

18. The oven as claimed in claim 17 and wherein the pivot bracket is pivotally mounted to one end of the base mounting bracket and the at least one sensor comprises a force sensing fastener supporting the pivot bracket at an opposite end of the base mounting bracket.

19. The oven as claimed in claim 18 and wherein the force sensing fastener comprises a strain pin.

20. The oven as claimed in claim 18 and wherein the force sensing fastener comprises a strain bolt.

21. The oven as claimed in claim 15 and wherein the control unit is programmed to change a rotational speed of the oven drive mechanism when the electrical signals from the first sensor or the second sensor meet predetermined criteria indicating excessive load in one of the left or right conveyor members, respectively.

22. The oven as claimed in claim 12 and wherein the control unit is programmed to stop, pause, or slow down the oven drive mechanism when the received electrical signals meet the predetermined criteria.

23. The oven as claimed in claim 13 and wherein the at least one element comprises a take-up assembly of the endless conveyor.

24. The monitoring system according to claim 1, wherein the strain in the first element is indicative of a force imparted to the first element, which force is reflective of drive load experienced by the oven drive mechanism.

25. The oven as claimed in claim 14 and wherein the at least one sensor comprises:
 a first sensor arranged to sense a force indicative of drive load in the left conveyor member proximate a drive end of the oven;
 a second sensor arranged to sense a force indicative of drive load in the right conveyor member proximate a drive end of the oven;
 a third sensor arranged to sense a force indicative of drive load in the left conveyor member proximate a feed end of the oven; and
 a fourth sensor arranged to sense a force indicative of drive load in the right conveyor member proximate a feed end of the oven.

26. The oven as claimed in claim 12 and wherein the at least one sensor comprises a torque sensor mounted inline to a drive shaft of the oven drive mechanism.

* * * * *